(12) United States Patent
Rooney

(10) Patent No.: US 8,413,955 B1
(45) Date of Patent: Apr. 9, 2013

(54) RESILIENTLY SUPPORTED VALVE SEAT ASSEMBLY FOR A SAFETY RELIEF VALVE

(75) Inventor: Christopher F. Rooney, Edmond, OK (US)

(73) Assignee: Taylor Innovations, LLC, Oklahoma City, OK (US)

( * ) Notice: Subject to any disclaimer, the term of this patent is extended or adjusted under 35 U.S.C. 154(b) by 530 days.

(21) Appl. No.: 12/572,753

(22) Filed: Oct. 2, 2009

(51) Int. Cl.
*F16K 25/00* (2006.01)

(52) U.S. Cl. ......... 251/171; 251/332; 251/334; 251/359

(58) Field of Classification Search .......... 251/321–364, 251/171, 174
See application file for complete search history.

(56) References Cited

U.S. PATENT DOCUMENTS

| | | | | |
|---|---|---|---|---|
| 2,676,782 A * | 4/1954 | Bostock et al. | ......... | 137/516.29 |
| 3,211,174 A | 10/1965 | Weise et al. | | |
| 4,043,351 A * | 8/1977 | Durling | ......... | 137/554 |
| 4,109,867 A | 8/1978 | Ebeling, Jr. | | |
| 4,302,997 A | 12/1981 | Jones et al. | | |
| 4,446,886 A | 5/1984 | Taylor et al. | | |
| 4,474,208 A * | 10/1984 | Looney | ......... | 137/516.29 |
| 4,566,486 A | 1/1986 | Taylor et al. | | |
| 4,735,462 A * | 4/1988 | Williams et al. | ......... | 303/9.68 |
| 4,834,338 A * | 5/1989 | Davis | ......... | 251/171 |
| 5,320,327 A * | 6/1994 | Beson | ......... | 251/172 |
| 5,803,073 A * | 9/1998 | Toth | ......... | 128/205.24 |
| 6,095,183 A | 8/2000 | Taylor et al. | | |
| 6,095,186 A * | 8/2000 | Nagel | ......... | 137/516.29 |
| 6,298,958 B1 | 10/2001 | Hwang | | |
| 6,334,487 B1 | 1/2002 | Adkins et al. | | |
| 6,467,587 B2 | 10/2002 | Sanchez et al. | | |
| 6,685,163 B2 * | 2/2004 | Blecha | ......... | 251/328 |
| 6,752,377 B1 | 6/2004 | Taylor et al. | | |
| 7,069,723 B2 | 7/2006 | Yamamoto et al. | | |
| 7,234,680 B2 | 6/2007 | Hull et al. | | |
| 2006/0017035 A1 * | 1/2006 | Bearer et al. | ......... | 251/174 |
| 2010/0200791 A1 * | 8/2010 | Yung et al. | ......... | 251/172 |

* cited by examiner

*Primary Examiner* — Eric Keasel
*Assistant Examiner* — Jessica Cahill
(74) *Attorney, Agent, or Firm* — Hall Estill Attorneys at Law

(57) ABSTRACT

A valve seat assembly for a pressure relief valve in which a valve member is biased against a valve seat to a closed position and movable away from the valve seat to an open position when inlet fluid pressure reaches a predetermined threshold value, the valve seat assembly having a seat body with an internal bore and positioned to abut the valve member when moved by the spring to the closed position. An insert member is disposed in the seat body to extend between an upper end of the seat body and a resilient member supported by the seat body for resiliently pressing against the insert member, the upper end of the insert member supporting the valve seat to seal with the valve member.

17 Claims, 3 Drawing Sheets

RESILIENTLY SUPPORTED VALVE SEAT ASSEMBLY FOR A SAFETY RELIEF VALVE

BACKGROUND

Safety relief valves often comprise a valve body having an outlet port disposed in proximity to an inlet passageway with a spring biased valve normally seated on a valve seat intersecting the inlet passageway to block fluid flow below a predetermined pressure limit, or set point pressure. Fluid pressure exceeding the set point will unseat the valve by compressing the spring, thereby permitting fluid flow while the fluid pressure remains above the set point pressure.

A commonly used safety valve design employs a precision valve such as a hemispherical valve disposed in a huddling chamber and seated on a precision metal or elastomeric seat. This type of relief valve enjoys the economy of manufacture of a precision valve member mated with a spherical lapped seat. While economical to manufacture, these valves can suffer from a relatively short service life due to a rapid deterioration of both the valve and the lapped seating surface as a result of mechanical reseating impact.

There is therefore a continued need for improvements to address these and other limitations of the prior art, and it is to such improvements that various embodiments of the present invention are generally directed.

SUMMARY

Various embodiments of the present invention are generally directed to a pressure relief valve having a valve seat assembly in which a valve member is biased against a valve seat to a closed position and moveable away from the valve seat to an open position when a pressure of inlet fluid reaches a predetermined threshold value. The valve seat assembly has a seat body with an internal bore and is positioned to abut the valve member when the valve member is moved to the closed position.

An insert member is disposed in the bore of the seat body to extend between an upper end of the seat body and a resilient member that is supported on the inner wall of the seat body. The resilient member resiliently presses against the insert member and is positioned to absorb a portion of the impact force received on the upper end of the insert member supporting upon seating of the valve member. In a preferred body, a ring seal is supported by the upper end to seal with the valve member.

These and various other features and advantages will be apparent from a reading of the following detailed description and drawings along with the appended claims.

DETAILED DESCRIPTION

Figure 1:
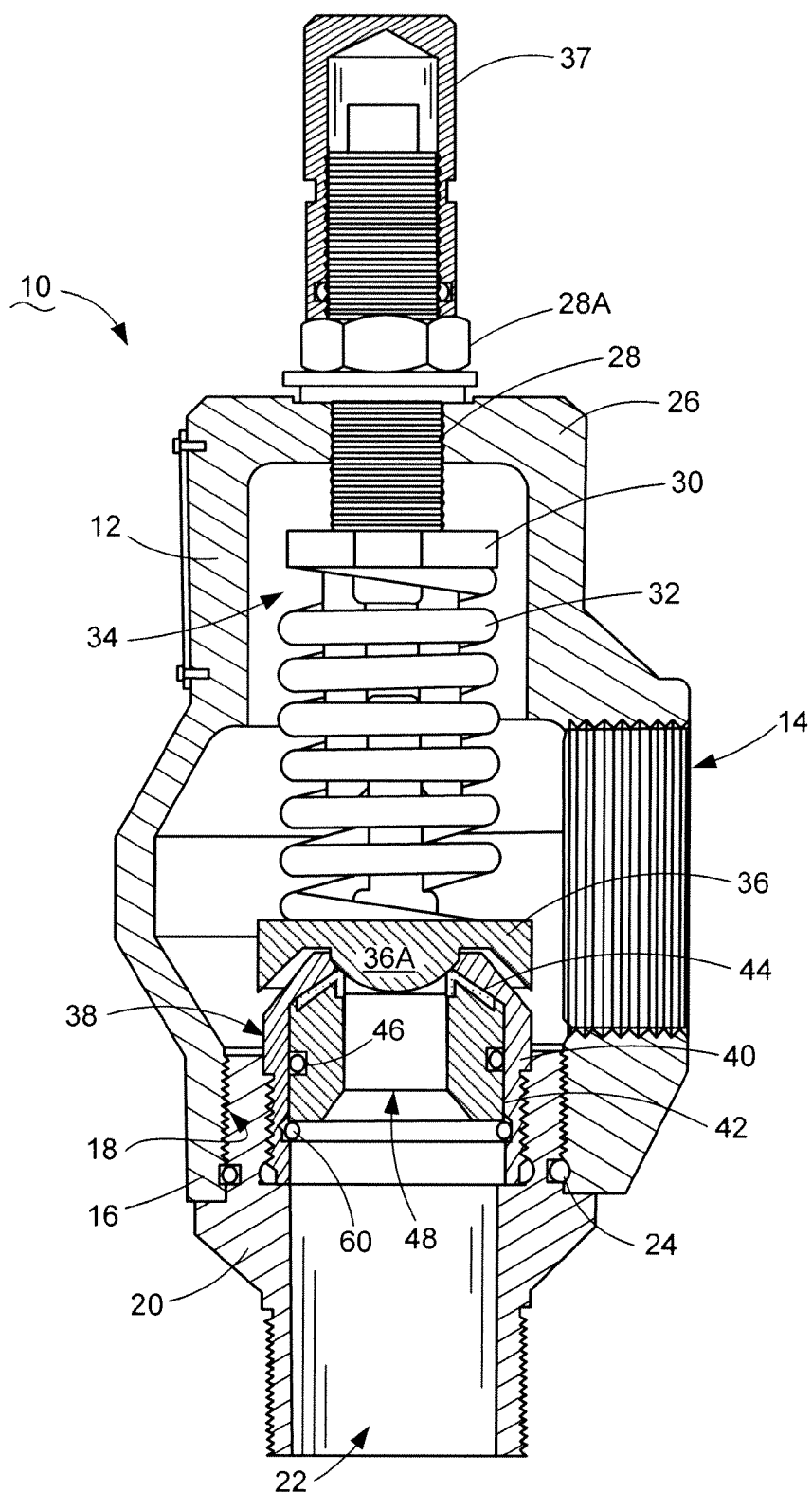
FIG. 1 is a partially cut away, cross-sectional view of a pressure relief valve constructed in accordance with preferred embodiments of the present invention.
Figure 2:
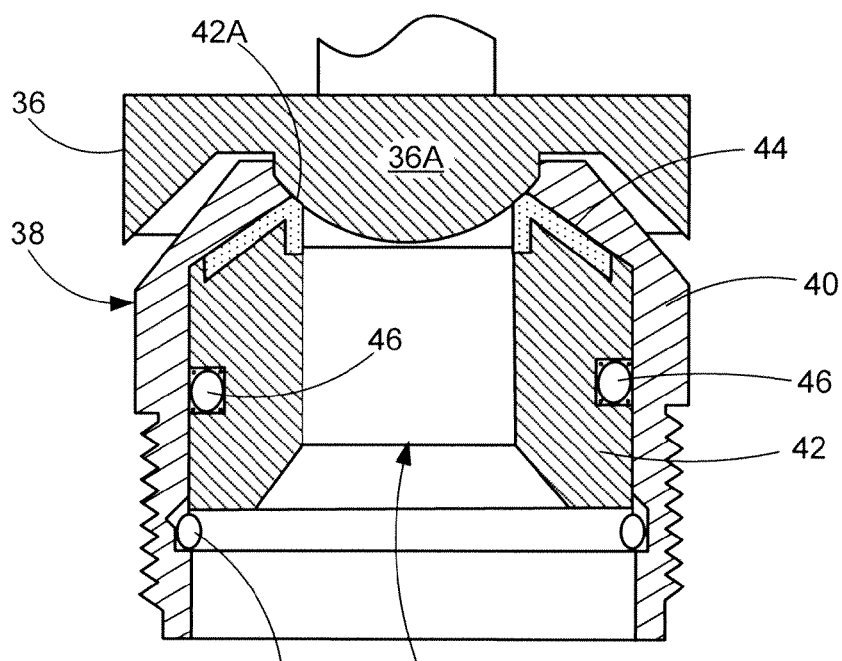
FIG. 2 is a partial, enlarged partially cutaway and cross-sectional view of the valve seat assembly and valve member of the pressure relief valve of FIG. 1.

Referring to the drawings in general and particularly to FIGS. 1 and 2, shown therein is a relief valve 10 constructed in accordance with the present invention. The relief valve 10 has a hollow elongated generally cylindrical shaped valve body 12 that has an internally threaded lateral outlet port 14. An inlet end 16 of the valve body 12 has a threaded inlet bore 18 that threadingly receives the external threads of an inlet port member 20 that makes up with the valve body 12.

The inlet port member 20 has an internal bore extending therethrough that serves as an inlet port 22. The inlet port member 20 is sealed by means of an o-ring 24. The inlet end 16 is externally threaded for connection to a line or fitting (not shown) containing fluid under pressure that is in fluid communication with the inlet port 22 for the relief valve 10 to safely relieve should the pressure of the fluid exceed a predetermined maximum threshold value.

The other end 26 of the valve body 12 supports an axially extending adjusting screw 28 that is threadingly engaged with a threaded bore (not separately numbered) in the valve body 12, the adjusting screw 28 provided to adjust the release pressure rating of the valve. The inward end of the adjusting screw 28 bears against a spring keeper 30 mounted on one end of a helical spring 32 the upper portion of which is nested in an upper chamber 34 that serves as a spring guide so that the spring 32 exerts a biasing force against a valve member 36 having a hemispherical seating portion 36A to close off and prevent passage of pressurized fluid in a normally closed position of the relief valve 10. The other end of the adjusting screw 28 extends from the valve body 12 and a lock nut/washer 28A maintains the position of the adjusting screw 28 once set.

The upper end of the adjusting screw 28 is shaped to receive a wrench for advancing the adjusting screw 28 into the valve body 12 to further compress the spring 32, and for retreating the adjusting screw 28 from the valve body 12 to reduce the compression on the spring 32, as advancing or retreating the adjusting screw 28 is the means for determining the value of the threshold pressure value that is required to open the valve member 36. An internally threaded protector cap 37 is shown mounted on the adjusting screw 28.

A stationary valve seat assembly 38 is supported in the valve body 12 by the inlet port member 20 and includes a seat body 40 and an insert member 42. Substantially cylindrically cup shaped, the valve seat assembly 38 serves to support a resilient seal ring 44, which is preferably a vulcanized elastomer positioned in a recess on the upper end of the insert 42. The seal ring 44 is preferably shaped with a precision upper cylindrical edge 42A that uniformly engages the hemispherical seating portion 36A as the valve member 36 is pressed there against by the biasing force of the spring 32.

The selection of material for the seal ring 42, while not critical, may be selected from plastics and elastomers that will not be cold formed by the pressure of the valve member 36, such as is the case for nylon and other similar materials. An acceptable material for this use is Delrin®, a registered trademark of E. I. DuPont de Nemours Company for synthetic resinous plastic material. However, it should be noted that the seal ring 42 can, for some service applications, be metallic to provide a metal to metal seal with the valve member 36. The choice of material for the seal ring 44 may be governed by the acceptable leakage as determined by the service application. A fluid leakage of less than about 0.02 standard cubic feet per hour is a typical requirement, and where this rigorous leakage cap is imposed, an applicator may look to an acceptable plastic or elastomer material for bubble free sealing.

The cylindrically shaped insert member 42 fits into and is slidingly positioned in the bore of the seat body 40. An o-ring 46 seals between the insert member 42 and seat body 40, as shown. An internal orifice 48 (throat) of the insert 42 is of a selected diameter to provide a desired volumetric flow through the relief valve 10 when the assembly is in the fluid flow open position, that is, when fluid flow through the outlet port 14 is effected to relieve the pressure of the fluid from the inlet port 22.

Figure 3:
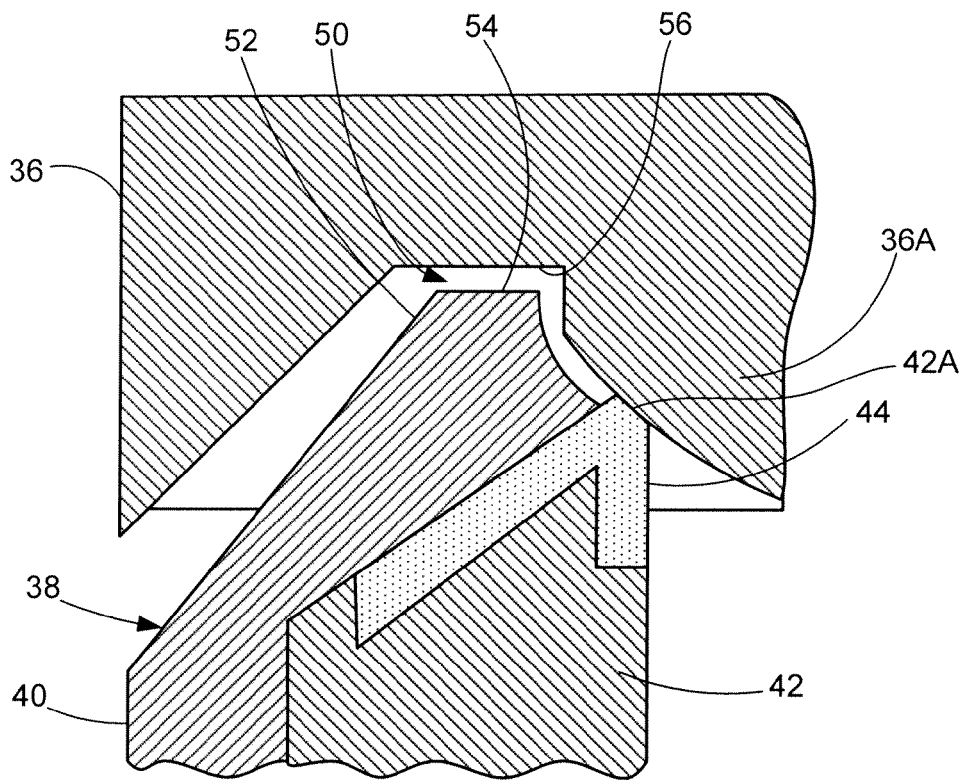
FIG. 3 is a partial, enlarged cross-sectional view of the upper sealing end of the valve seat assembly and valve member of the pressure relief valve member of FIG. 1.

With reference to FIG. 3, it is shown that the valve member 36 has a relief space 50 surrounding the hemispherical seating portion 36A in which the upper end 52 of the seat body 40 is shaped to be received, while clearing the seating portion 36A, once the relief valve has assumed its closed position with the seating portion 36A seated against the seal ring 42. As discussed below, the upper end of the seat body 40 has a valve impacting surface 54 that will first be impacted by an under surface 56 of the valve member 36 when, following pressure relief by the relief valve 12, the valve member 36 is moved via the spring 32 to close the relief valve.

Figure 4:
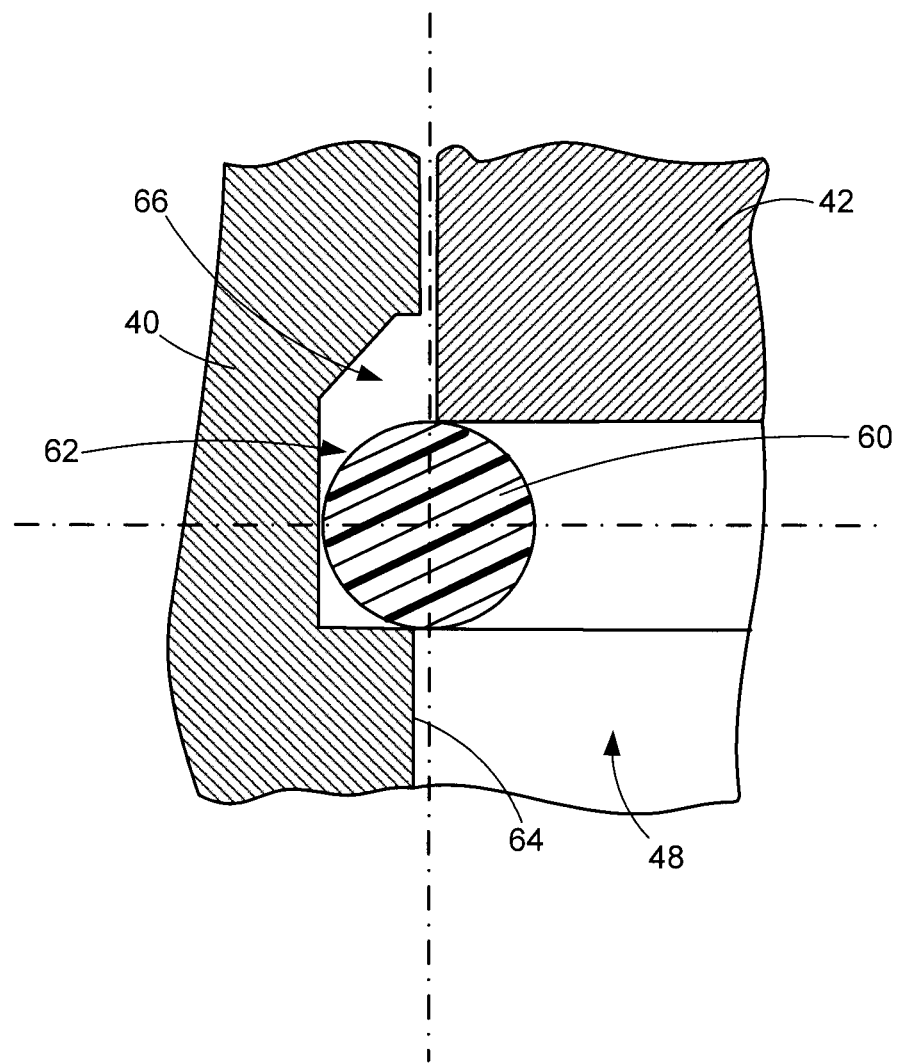
FIG. 4 is an enlarged cross-sectional view of the resilient member of the pressure relief valve of FIG. 1.

The insert member 42 is retained in the seat body member 40 against a resilient member 60, which is capable of withstanding valve closing impact without occurring permanent deformation. The resilient member 60 is supported at the lower end of the insert member 42 by the seat body 40. As best shown in FIG. 4, the resilient member 60 is retained on a retention shelf 62 formed in the inner wall 64 of the seat body 40 within the orifice bore 48. A relief space 66 is provided for expansion of the resilient member 60.

In some service applications, the preferred construction of the resilient member 60 will be that of a compressible o-ring made of an elastomeric material with a sufficiently high durometer rating to absorb the impact of the insert member 42 upon impact by the valve member 36. In high temperature service, a suitable material for an o-ring may not be available, and in those instances and possibly in other instances, the resilient member 60 may be a Bellville washer with suitable compression capability to absorb the impact energy of the closing of the valve member 36. When an o-ring is used, it is preferable that the dimensions of the retention shelf 62 and diameter of the resilient member 60 be selected so that the plane of the great diameter of the resilient member 60 is substantially tangential along the length of the outer surface of the insert member 42, as depicted in FIG. 4.

In operation, when the pressure of fluid in the inlet port 22 is insufficient to force the valve member 36 to compress the spring 32, the relief valve 10 remains in the closed position. When the fluid pressure in the inlet port 22 reaches a high enough value to open the valve member 36 against the spring 32, fluid will flow through the valve seat assembly 38 to be discharged from the outlet port 14. Once the pressure is lowered by such discharge, the spring 32 will force the valve member 36 to again seal against the valve seat assembly 38.

In practice, when pressure is relieved by the relief valve 10, it is common to speak of the value as having "popped," and due to the physical force which occurs upon the sealing member, the sealing efficacy of the relief valve deteriorates with each pop. It is common for a spring loaded relief valve to have five or less pops before having to be repaired or replaced. The reason for this will become clear when considering what actually happens following each pop, that is, after each pressure blow off.

When the valve member 36 is forcefully returned to its seated position, the valve member 36 first impacts the upper cylindrical edge 42A of the seal ring 44, compressing the seal ring 44 followed by the undersurface 56 of the valve member 36 striking the upper surface 54 of the seat body 40. Further, should there occur a fluttering or pressure cycling about the set point (that is, a repeated pressure increase and decrease at or near the set point), a low resonant opening and closing of the valve member 36, sometimes referred to as pressure chattering, can occur on the seal ring 44, delivering a continuing relatively low impact, repetitive striking, of the sealing surfaces.

In a conventional relief valve, the impact force following a valve pop quickly deteriorates or destroys the sealing integrity of the seal; further, chattering can rapidly deteriorate the sealing surfaces. In the relief valve 10, by contrast, the impact force of the returning valve member 36 drives the insert member 42 against the resilient member 60. The member 60 yields to absorb a significant portion of the impact force, and eliminates or greatly reduces the effect of repetitive pressure flutter.

As the downward movement of the valve member 36 is stopped, the resilient member 60 moves the insert member 42 upward and the seal ring 44 reestablishes closure of the internal orifice by sealing against the hemispherical seating portion 36A of the valve member 36.

The shock absorbing capability of the valve seat assembly 38 provided by the resilient support of the insert member 42 by the resilient member 60 results in providing the relief valve 10 the capability of sustaining many more pops than currently available in conventional relief valves. Test results have confirmed the improvement in pop endurance of the relief valve 10 can exceed conventional relief valves by several orders of magnitude, often as much as several hundred pops being endured before appreciable sealing deterioration.

It will now be appreciated that the various embodiments disclosed herein present an improved seating construction that provides the economies of a spherical-shaped valve member and the bubble tight qualities of a resilient precision seat. Service life expectancies may be several orders of magnitude greater than that of conventional safety relief valves. It is believed that one reason for these improvements in service life may lie in the vulcanization of an elastomer to a metal surface that is resiliently supported, thereby maintaining the cylindrical precise seating lip while absorbing a portion of the impact following a pop of the safety valve. Another reason for the enhanced service life of the various embodiments may be related to the geometry of the seat lip, in that fluid pressure tends to move the resilient lip into bubble tight closure with the spherical valve member.

For purposes of the appended claims, the recited resiliently pressing means will be understood to at least correspond to the disclosed resilient member 60 arranged as disclosed herein and equivalents thereof, including but not limited to the aforementioned Bellville washer.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a pressure relief valve, it will be appreciated by those skilled in the art that the claimed subject matter is not so limited and various other systems can utilize the embodiments of the present invention without departing from the spirit and scope of the claimed invention.

What is claimed is:

1. A valve seat assembly for a pressure relief valve having a valve member biased against a valve seat, the valve seat assembly comprising:
   a seat body having an upper end, a lower end, and an internal bore, the seat body positioned to abut the valve member in a closed position;
   an insert member supporting the valve seat and disposed in the internal bore to abut the upper end of the seat body; and
   means for resiliently supporting the insert member to reduce impact force and repetitive pressure flutter as the valve member transitions to the closed position, wherein the means for resiliently supporting the insert member comprises an elastomeric o-ring supported by the seat body, and wherein the seat body has a retention shelf, and wherein the o-ring is supported thereby such that the o-ring is adjacent a bottom-most portion of the insert member and is inside the seat body.

2. The valve seat assembly of claim 1, further comprising a resilient seal ring supported by the insert member and configured to seal against the valve member in the closed position.

3. The valve seat assembly of claim 1 wherein the seal ring is made of an elastomer.

4. The valve seat assembly of claim 1, wherein the insert member has an outer surface and wherein the o-ring is supported so that the plane of the great diameter of the resilient member is tangential along the length of the outer surface of the insert member.

5. The valve seat assembly of claim 4, wherein the retention shelf provides a relief space for expansion of the o-ring.

6. A valve seat assembly for use in a pressure relief valve having a moveable valve member biased against a valve seat to a closed position and movable away from the valve seat to an open position when inlet fluid pressure reaches a predetermined threshold value, the valve seat assembly comprising:
   a substantially cylindrically shaped seat body having opposing first and second ends and an internal bore, the first end positioned to abut the valve member when the valve member is in the closed position;
   an insert member having opposing first and second ends and disposed in the bore of the seat body, the first end of the insert member abutting the first end of the seat body and positioning the valve seat; and
   a compressible member supported by the seat body which resiliently presses against the second end of the insert member and deforms to facilitate axial displacement of the insert member with respect to the seat body during transition of the valve member to the closed position, wherein the seat body has a retention shelf, and wherein the compressible member is supported thereby, such that the compressible member is adjacent a bottom-most portion of the insert member and is inside the seat body.

7. The valve seat assembly of claim 6, wherein the compressible support member comprises a Belleville washer.

8. The valve seat assembly of claim 6, further comprising:
   a resilient seal ring supported by the first end of the insert member and configured to seal against the valve member when the pressure relief valve is in the closed position.

9. The valve seat assembly of claim 8 wherein the seal ring is made of an elastomer.

10. The valve seat assembly of claim 8 wherein the seal ring comprises a vulcanized material, which is positioned in a recess on the first end of the insert member.

11. The valve seat assembly of claim 6, in which the compressible support member comprises an elastomeric o-ring supported between the insert member and the seat body.

12. The valve seat assembly of claim 11, wherein the insert member has an outer surface and wherein the o-ring is supported so that the plane of the great diameter of the resilient member is tangential along the length of the outer surface of the insert member.

13. The valve seat assembly of claim 12, wherein the retention shelf provides a relief space for expansion of the o-ring.

14. An apparatus comprising:
   a housing having an internal fluidic passageway to accommodate a flow of a pressurized fluid;
   a normally closed valve member disposed within the housing for movement between a closed position and an open position; and
   a valve seat assembly disposed within the housing comprising a substantially cylindrical outer seat body, a substantially cylindrical inner insert member nested within the seat body, an annular seal ring disposed between the seat body and a first end of the insert member, and an annular elastomeric o-ring supported by a retention shelf in the seat body between the seat body and an opposing second end of the insert member, such that the o-ring is adjacent a bottom-most portion of the insert member and is inside the seat body, the o-ring facilitating controlled axial displacement of the insert member relative to the seat body to reduce impact force upon the seal ring as the valve member transitions to the closed position.

15. The apparatus of claim 14, wherein the retention shelf is an annular groove that extends into the seat body insert member, the groove providing a relief space for outward deformation of the o-ring during said transition.

16. The apparatus of claim 14, further comprising a second elastomeric o-ring sealingly disposed between the seat body and the housing.

17. The apparatus of claim 14, wherein the seal ring comprises vulcanized rubber.

* * * * *